United States Patent [19]
Albertazzi

[11] 4,355,467
[45] Oct. 26, 1982

[54] METHOD AND APPARATUS FOR CHECKING PARTS OF A CONSTANT VELOCITY JOINT

[75] Inventor: Gastone Albertazzi, Bologna, Italy

[73] Assignee: Finike Italiana Marposs S.p.A., S.Marino di Bentivoglio, Italy

[21] Appl. No.: 209,975

[22] Filed: Nov. 24, 1980

[30] Foreign Application Priority Data

Dec. 3, 1979 [IT] Italy ............................ 3558 A/79

[51] Int. Cl.³ .............................................. G01B 7/28
[52] U.S. Cl. ................................. 33/143 L; 33/149 J; 33/178 E; 33/174 PA
[58] Field of Search ............ 33/143 L, 147 K, 147 N, 33/148 H, 149 J, 174 P, 174 PA, 174 Q, 178 E, 180 AT, 181 AT

[56] References Cited

U.S. PATENT DOCUMENTS

| | | | |
|---|---|---|---|
| 3,808,696 | 5/1974 | Possati | 33/174 PA |
| 4,077,130 | 3/1978 | Possati | 33/178 E |
| 4,176,461 | 12/1979 | Geber et al. | 33/174 PA |
| 4,233,744 | 11/1980 | Possati | 33/174 PA |

FOREIGN PATENT DOCUMENTS

| | | |
|---|---|---|
| 1436721 | 5/1976 | United Kingdom . |
| 1463533 | 2/1977 | United Kingdom . |
| 1477508 | 6/1977 | United Kingdom . |
| 1492401 | 11/1977 | United Kingdom . |
| 1525697 | 9/1978 | United Kingdom . |
| 2033588 | 5/1980 | United Kingdom . |

*Primary Examiner*—Willis Little
*Attorney, Agent, or Firm*—Stevens, Davis, Miller & Mosher

[57] ABSTRACT

The invention relates to a method and apparatus for checking the bell member of a constant velocity joint, wherein the joint member, positioned by reference devices, is checked by gauging devices cooperating with the ball races.

Processing circuits provide signals representative of the positions of the centers of the ball races, in an equatorial plane, for determining the dimensions of the bell member with reference to the center of a circumference approximating the centers of the ball races.

11 Claims, 6 Drawing Figures

METHOD AND APPARATUS FOR CHECKING PARTS OF A CONSTANT VELOCITY JOINT

The present invention relates to a method for checking parts of a constant velocity joint, in particular for checking the bell member or the inner race member of a spheric joint, or the corresponding members of an axial joint, the method including the steps of obtaining measurement signals representative of dimensions of the member concerned and the step of processing the measurement signals for obtaining second measurement signals.

The invention also relates to an apparatus for performing the method, with first support means for supporting the member to be checked, a measuring or gauging device having a plurality of gauging heads for obtaining measurement signals representative of the positions of points of the member; second support means coupled to the first support means for supporting the gauging device; and processing means connected to the gauging heads for processing the measurement signals.

As it is well-known, the bell member of a spheric constant velocity joint includes a hollow body with an inner surface having the shape of a spheric zone with six toroidal races, spaced 60° from one another, which provide seats for the joint balls.

The constant velocity joints, well-known for decades, have now an increasing application in the car industry and therefore there is now the need to check the different parts of the joint in an effective way, with accuracy, repeatability and speed suitable for the mass production and for the important functions performed by the joints.

An object of the invention is to provide a method for checking parts of a constant velocity joint which is adapted to furnish significative measurements in view of the operating conditions of the joints.

Another object of the invention is to provide an apparatus for carrying out the method with a high degree of accuracy and repeatability.

Another object is to provide an apparatus particularly adapted to check the bell member and the inner race member of spheric constant velocity joints as well as the corresponding members of axial joints.

A further object is to provide an apparatus which may be easily adapted to perform similar measurements on different parts of constant velocity joints.

According to the invention, in the method outlined at the beginning of the present disclosure, the measurement signals representative of dimensions of the member represent dimensions of the ball races and the processing step includes determining the positions of the centers of the ball races in an equatorial plane and determining the center of a circumference approximating said centers, this center constituting a reference point for the member checking.

According to the invention, in the apparatus outlined at the beginning of the disclosure, said gauging heads are adapted to provide measurement signals representative of dimensions of the ball races in an equatorial plane of the races and the processing means are adapted to process the measurement signals for defining the centers of the ball races in said equatorial plane and for determining the center of a circumference approximating the centers of the ball races, this center being used as a reference point for the member checking.

Below, the invention is explained in detail with reference to the annexed drawings, given for exemplary and not limiting purposes, wherein.

Figure 1:
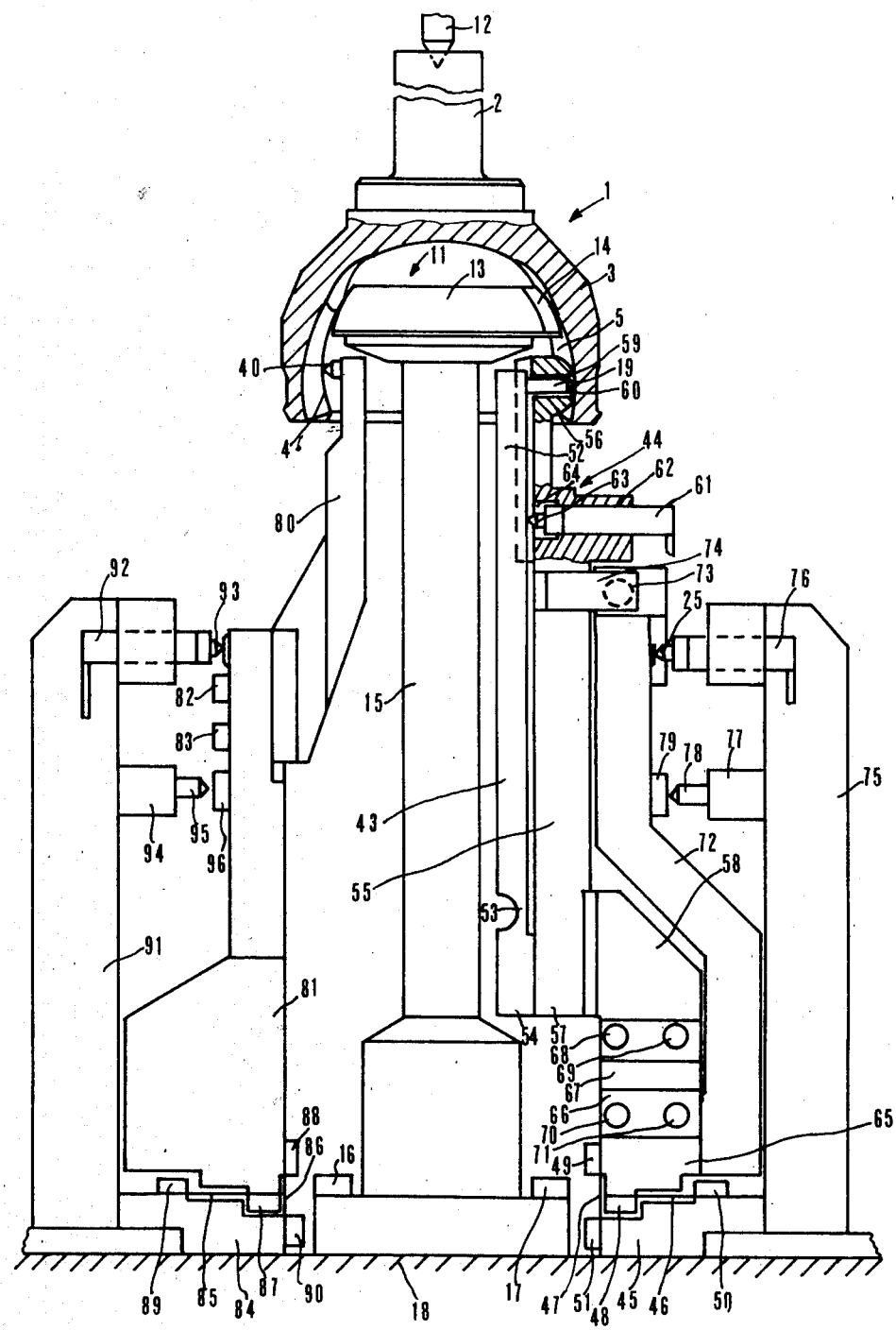
FIG. 1 is a simplified cross-sectional elevation of a measuring apparatus for checking the bell member of a spheric constant velocity joint, according to a preferred embodiment.
Figure 2:
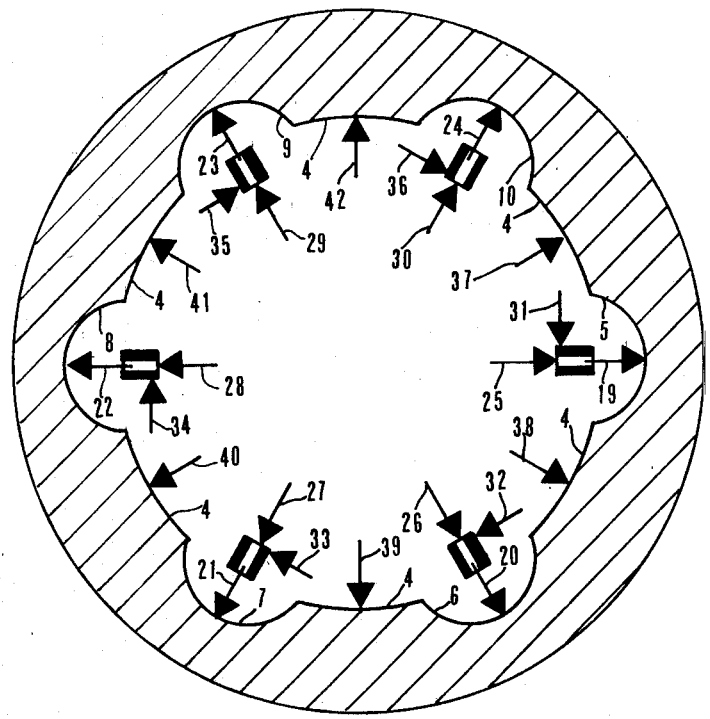
FIG. 2 is a horizontal cross-sectional view showing arrangement of the measuring contacts or feelers, of the apparatus of FIG. 1.

With reference to FIGS. 1 and 2, a bell member 1 of a spheric constant velocity joint includes a stem 2 for coupling the bell member 1 to the wheel hub of a car and a hollow body 3 defining an inner surface having substantially the shape of a spheric zone surface 4 defining six toroidal races 5-10 whose cross-sections are substantially semicircular.

Races 5-10 are angularly arranged at 60° from one another; when the joint is assembled relevant balls can move, substantially along the longitudinal direction of the joint, on races 5-10.

Bell member 1 is positioned with respect to the apparatus by means of a nose-piece 11 and an axially movable center 12, which engages a center hole obtained in the upper end of stem 2.

Nose-piece 11 comprises a spheric zone surface 13 - adapted to cooperate with the spheric zone surface 4 of bell member 1 - and a reference element or pawl 14 arranged in race 5 for defining the angular positioning of bell member 1 with respect to the measuring apparatus.

Nose-piece 11 is supported by a stanchion 15 coupled, through screws 16, 17, to a plate fixed to a base 18.

The measuring apparatus comprises twenty-four contacts or feelers 19-42 whose arrangement is schematized in FIG. 2.

Contacts 19-24, only one of which, 19, is visible in FIG. 1, touch the bottom line of races 5-10 in points lying on the equatorial plane of the races.

Contacts 19-24 are fixed to corresponding arms 43 of relevant arm-sets 44.

Each arm-set 44, only one of which is visible in FIG. 1, is coupled to a block 45 through two perpendicular flat springs 46,47.

Springs 46,47 are coupled to arm-set 44 and block 45 through screws 48, 49 and 50,51, respectively.

All arm-sets 44 are similar and will be described with reference to that shown in FIG. 1.

Arm 43 carries contact 19 at an end 52 and has a lightened section 53 i.e. has a smaller thickness in order to act as a fulcrum or pivot, perpendicular to the longitudinal axis of arm 43, for the rotation of end 52 with the associated contact 19.

An element 54 for supporting arm 43 is integrally connected to lightened section 53 and is coupled to an arm 55.

Arm 55 has an end section 56, with a shape substantially hemispheric, adjacent to end 52 of arm 43, and an end 57 coupled to a block 58.

A flat chamfer 59 parallel to the longitudinal axis of arm 55 and a bore 60, having its axis perpendicular to chamfer 59, are obtained in section 56.

Contact 19 may move within bore 60, substantially along the direction of the bore 60 axis.

A gauging head 61, of the "cartridge" type, including an inductive position transducer, is housed within a hole 62 of arm 55 and is fixed to arm 55 by means of a screw not visible.

Gauging head 61 has a contact or feeler 63 which, passing through a hole 64 of arm 55, touches arm 43 and detects its displacements due to the rotation about the fulcrum defined by the lightened section 53.

Block 58 is coupled to a block 65 through a plate 66 having a lightened section 67, which defines a fulcrum substantially perpendicular to the longitudinal axis of arm 55, for the pivoting of block 58 and of arms 43,55 coupled thereto; flat springs 46,47, too, are coupled to block 65.

Plate 66 is coupled to blocks 58 and 65 by means of screws 68,69, 70, 71.

Block 65 constitutes an end of an arm 72 having another end supporting a cartridge gauging head 73, shown by a dashed line in FIG. 1.

Gauging head 73 comprises contact 31 shown in FIG. 2 and measures the displacements of a ledge 74, fixed to arm 55, when arm 55 rotates about the fulcrum defined by lightened section 67.

A stanchion 75, coupled to base 18 in a way not shown, supports a cartridge gauging head 76 comprising contact 25, which detects displacements of arm-set 44 about the fulcrum defined by flat springs 46,47.

To stanchion 75 there is also coupled a small cylinder 77 carrying a tapered pin 78 which can cooperate with a ledge 79 of arm 72 for limiting the rotational movement of arm-set 44 about the fulcrum defined by flat springs 46,47.

Bell member surface 4, which constitutes a seat for the joint cage, is checked by six contacts 37–42, which touch points lying on the equatorial plane of surface 4.

Contact 40 and the elements of the apparatus which are associated to contact 40 are shown in FIG. 1; similar elements of the apparatus are associated to contacts 38–42 and will not be described.

Contact 40 is fixed to an arm 80 which is coupled to a member 81 by screws 82,83.

Member 81 is coupled to a block 84, fixed to base 18, by two perpendicular flat springs 85,86.

Flat springs 85,86 are coupled to member 81 by screws 87,88 and to block 84 by screws 89,90.

Flat springs 85,86 define a fulcrum for pivotal movement of member 81 and arm 80 with contact 40.

The rotational movement of member 81 about the above mentioned fulcrum permits, in substance, displacements of contact 40 in the equatorial plane of surface 4, along a direction perpendicular to surface 4.

A stanchion 91, adjacent to member 81, is coupled to base 18 in a way not shown.

Stanchion 91 supports a cartridge gauging head 92 having a contact 93 which detects the rotational displacements of member 81 about the fulcrum defined by flat springs 85,86.

A small cylinder 94, coupled to stanchion 91, carries a tapered pin 95 which can cooperate with a ledge 96 of member 81, limiting the rotational movement of member 81 towards stanchion 91.

The operation of the measuring apparatus is now described with reference to FIGS. 3 to 6.

A retraction device, per se known and not shown in the drawings, causes the rotation of arm-sets 44 and of members 81 about the relevant fulcrums in such a way as to permit loading of a master bell member 1 without any interference between the latter and contacts 19–24 and 37–42.

Center 12 is lowered to engage the center hole surface of stem 2 and bell member 1 is positioned, as mentioned before, by nose-piece 11, pawl 14 and center 12.

After positioning of the master bell member 1, the retraction device releases arm-sets 44 and member 81 permitting them to approach the surface of bell member 1 due to the resilient forces provided by the elements defining the fulcrums and by return springs, not shown; thus the relevant contacts touch the bell member surface in the established points.

Center 12 and nose-piece 11 define an axis, coinciding with the bell member main geometric axis, when the bell member is positioned with respect to the measuring apparatus.

In the master bell member (FIG. 4) the six races 5–10 have, in their equatorial plane, centers $C'_5$–$C'_{10}$ which belong to a circumference Q having a radius $R_o$ and whose center lies on the bell member geometric axis; moreover, centers $C'_5$–$C'_{10}$ belong to relevant radiuses of circumference Q which are arranged at 60° from one another.

Races 5–10 of the master bell member have substantially a transversal contour of a semicircular shape, with a radius $D_o$.

The points of the cage seat surface 4, in the equatorial plane of surface 4, belong to a circumference with a radius $F_o$; the center of this circumference lies in the geometric axis of the master bell member.

The measuring apparatus is electrically and mechanically zero-set with reference to the master bell member, in such a way that the output signals of the cartridge gauging heads have a null value.

After zero-setting the apparatus the retraction device is operated to move arm-sets 44 and members 81 away from the master bell member surface.

Then the master bell member can be unloaded and a bell member 1 to be checked is loaded and positioned, as described before, by means of center 12, nose-piece 11 and pawl 14.

Subsequently the retraction device releases arm-sets 44 and members 81, which approach the bell member 1 surface.

The chamfered edges of hemispheric sections 56, cooperating with the sides of races 5–10, cause pivotal movements of arms 55 about the fulcrums defined by lightened sections 67, substantially along directions which are transversal with respect to the bottom lines of races 5–10, and pivotal movements about the fulcrums defined by springs 46, 47, substantially along directions which are perpendicular to the surface of races 5–10; in this way contacts 19–24 are positioned to touch the bottom points of races 5–10 in the equatorial plane of the races.

The radial deviations of the positions of contacts 19–24 from their nominal or zero positions (i.e. with reference to the master bell member), are measured by the corresponding gauging heads 61 which detect the rotational displacements of arms 43 about the fulcrums defined by lightened sections 53.

Figure 3:
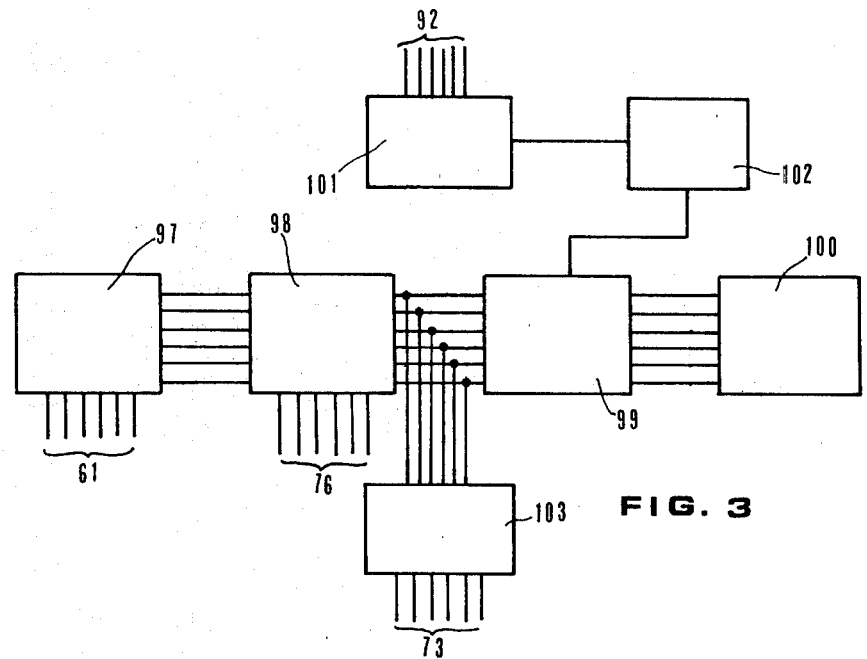
FIG. 3 is a diagram of the electric circuits of the apparatus of FIGS. 1 and 2.
Figure 4:
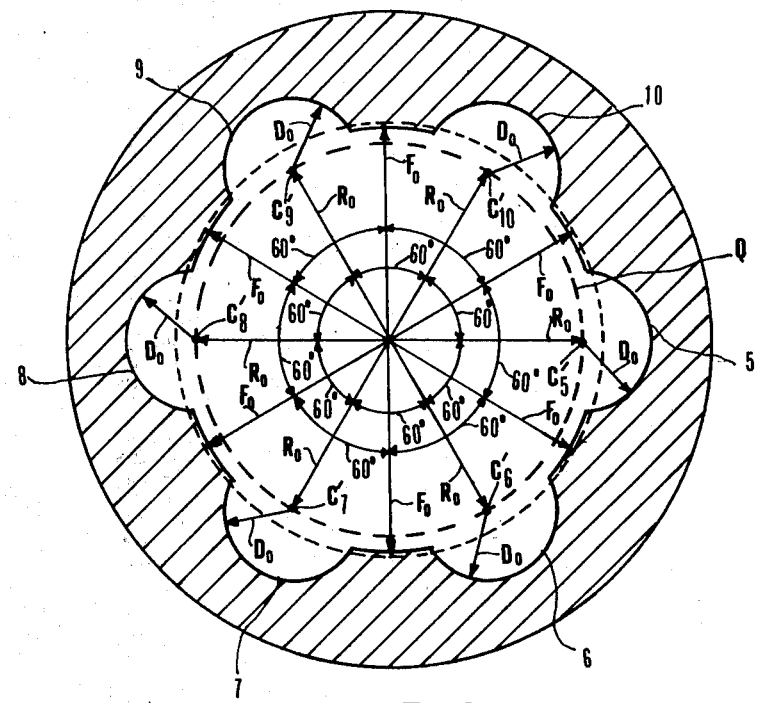
FIG. 4 is a horizontal cross-sectional view showing the nominal sizes of the member to be checked.

The measurement signals provided by gauging heads 61 are sent to a circuit 97, FIG. 3, which calculates, in substance, the radiuses of the six races 5–10.

The calculation of the radiuses is based on the known method of calculating the radius of a circumference from the length of a chord and that of the camber or height of the arc subtended by the chord.

Chamfers 59 of hemispheric sections 56 contact the sides of races 5–10 in symmetrical points along chords having a known length, and contacts 19–24 and the relevant gauging heads 61 provide signals representative of the deviations of the cambers from a nominal value. Circuit 97 processes the signals of the gauging heads 61 for obtaining the deviations of the radiuses of the six races 5–10 from the nominal value $D_o$.

A circuit 98 receives at its inputs the output signals of circuit 97 and the signals of gauging heads 76; the latter signals are representative of the positions of the hemispheric sections 56 along directions perpendicular to the bottom line of the races. Circuit 98 provides output signals $T_i (5 \leq i \leq 10)$ representative of the radial deviations of the positions of centers $C_5$–$C_{10}$—with respect to the positions of the corresponding centers $C'_5$–$C'_{10}$ of the master bell member—from a reference center O, FIG. 5, which constitutes the intersection point with the equatorial plane of races 5–10 of the axis defined by center 12 and nose-piece 11, this axis coinciding with the main geometric axis of the bell member.

Figure 5:
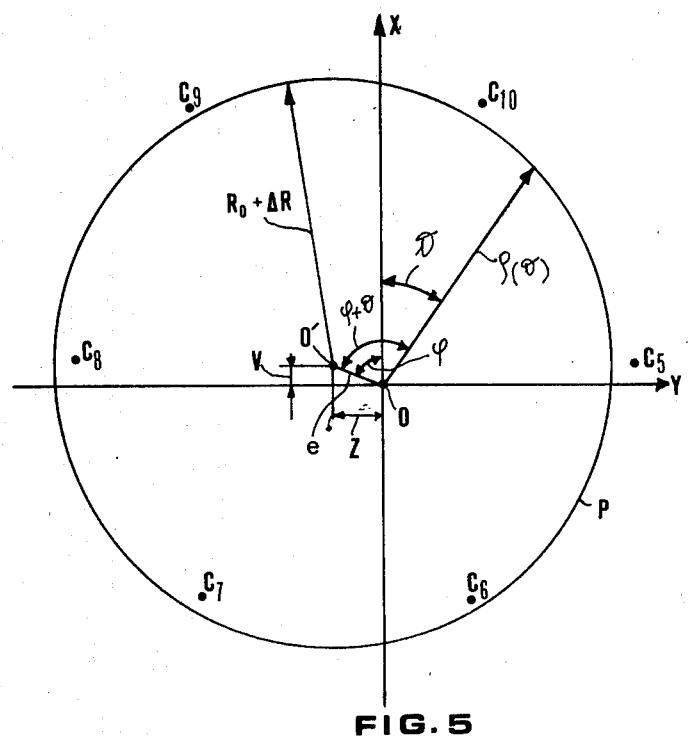
FIGS. 5 and 6 are schematic diagrams for explaining the processing performed by the circuits of FIG. 3.

Signals $T_i$ are applied at the inputs of a circuit 99, which processes them to determine, by the statistical method of "the least squares", the center O', FIG. 5, of the circumference P which better approximates the six centers $C_5$–$C_{10}$; moreover circuit 99 provides signals representative of the distances of centers $C_5$–$C_{10}$ from the center O' thus determined.

The processings carried out by circuit 99 for obtaining, from signals $T_i$, the parameters which permit to define circumference P and its center O' are now explained. With reference to FIG. 5, "e" is the eccentricity between centers O and O'.

Indicating by $R_o + \Delta R$ the radius of circumference P, by $\rho = \rho(\theta)$ the distance of the points of circumference P from center O and by V and Z, respectively, the components of eccentricity e along two perpendicular axes X, Y having center O as a common point, since e is very small, it is possible to write:

$$V = e \cos \phi \qquad (1)$$

$$Z = e \sin \phi \qquad (2)$$

$$\rho(\theta) = R_o + \Delta R + e \cos(\phi + \theta) \qquad (3)$$

where $\phi$ is the angle between the straight line passing through O and O' and axis X, while $\theta$ is the angle defined by radius $\rho$ and axis X.

By developing equation (3) and substituting in it the quantities according to equations (1) and (2) one obtains:

$$\rho(\theta) = R_o + \Delta R + V \cos \theta - Z \sin \theta \qquad (4)$$

Indicating by $R_o + T_i$ the distance of center $C_i$ ($5 \leq i \leq 10$) from center O, the quantity $$S_i = \rho(\theta_i) - (R_o + T_i) \qquad (5)$$

represents the distance of center $C_i$ from the corresponding point of circumference P along the direction of the straight line joining $C_i$ with center O.

By introducing in equation (5) the value $\rho(\theta)$ provided by equation (4) one obtains:

$$S_i = \Delta R + V \cos \theta_i - Z \sin \theta_i - T_i \qquad (6)$$

In order that the sum of the squares of the distances $S_i$ ($5 \leq i \leq 10$) be minimum, it is necessary that:

$$\frac{\partial \sum_{5}^{10} S_i^2}{\partial \Delta R} = 0 \qquad (7)$$

$$\frac{\partial \sum_{5}^{10} S_i^2}{\partial V} = 0 \qquad (8)$$

$$\frac{\partial \sum_{5}^{10} S_i^2}{\partial Z} = 0 \qquad (9)$$

Since the machine tools which machine races 5–10 of bell member 1 guarantee, with sufficient approximation, at least for determining center O', that centers $C_5$–$C_{10}$ are angularly spaced, with respect to center O, of 60° with respect to one another, by casting equations (7), (8), (9) and substituting the values of $\theta_i$, one obtains:

$$\Delta R = \frac{1}{6} \sum_{5}^{10} T_i \qquad (10)$$

$$A_i = \frac{1}{4}[(T_{i+3} - T_i) + \frac{1}{2}(T_{i+2} - T_{i+1} - T_{i+5} + T_{i+4})] \qquad (11)$$

$$B_i = \frac{\sqrt{3}}{6}(T_{i+1} + T_{i+2} - T_{i+4} - T_{i+5}) \qquad (12)$$

where $A_i$ and $B_i$ are the components of eccentricity e along the directions of the straight lines joining center O with centers $C_5$–$C_{10}$ and along the directions perpendicular to these lines, respectively.

With good approximation it may be assumed that the distance of center $C_i$ from center O' is:

$$R_i = R_o + T_i + A_i \qquad (13)$$

In conclusion, the distances of centers $C_5$–$C_{10}$ from center O' are determined by circuit 99 through simple processing of signals $T_i$, this processing including sums and multiplications by constant factors.

The outputs of circuit 99, which are representative of values $R_i$, are applied to the inputs of a circuit 100 which calculates a parameter indicative of mislocation of the ball races 5–10, i.e. of the concentricity error of centers $C_5$–$C_{10}$, as the difference between the maximum and the minimum value of $R_i$.

Gauging heads 92 provide signals representative of the distances of the associated contacts 37–42 from the axis passing through O. These signals are applied to the inputs of a circuit 101, substantially similar to circuit 99, which processes them to determine the center of the circumference which better approximates the six points of the cage seat surface 4 contacted by contacts 37–42.

A circuit 102, connected to circuits 101 and 99, calculates the mislocation, i.e. the eccentricity of the case seat surface 4 with respect to the six races 5–10 as the value of the distance between the axes-parallel to the main geometric axis passing through O—which pass, respectively, through O' and through the center of the circumference which better approximates the six points of the cage seat surface 4 contacted by contacts 37–42.

Gauging heads 73, with the relevant contacts 31–36, provide signals representative of the deviations of the positions taken by hemispheric sections 56—with respect to the corresponding positions taken on the races of the master bell member—along transversal directions; the relevant transversal direction for arm-set 44 and gauging head 73 shown in FIG. 1 is the direction perpendicular to the plane of FIG. 1.

These signals are applied to a circuit 103 which is also connected to the outputs of circuit 98; circuit 103 processes its input signals for determining the angular relationships between the straight lines joining centers $C_5$–$C_{10}$ with center O'. In this processing it is not possible to disregard the angular errors relating to the straight lines joining centers $C_5$–$C_{10}$ with center O, which may be present after machining of races 5–10 by machine tools.

Hereinafter notations $\alpha_{i,j}$ ($5 \leq i,j \leq 10$; $i \neq j$) will indicate the angles defined by the points of straight lines joining center O with two centers $C'_i$, $C'_j$ of races 5–10 of the master bell member; rotations $(\alpha_{i,j}+\beta_{i,j})$ will indicate the angles defined by the points of straight lines joining center O' with two centers $C_i$, $C_j$ of the races of the bell member 1 to be checked. It may be demonstrated that for calculating $(\alpha_{i,j}+\beta_{i,j})$ it is possible to consider, besides the angular errors mentioned before, only the components of eccentricity e along the direction of the bisecting lines of angles $\alpha_{i,j}$, without making, in this way, substantial errors.

Figure 6:
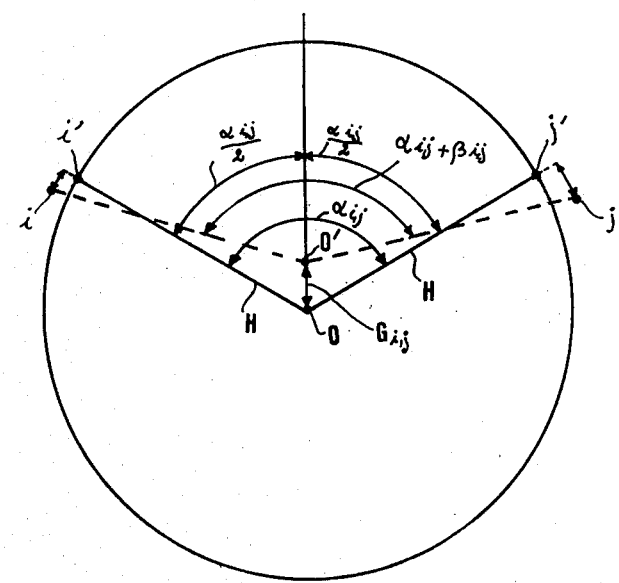

With reference to FIG. 6, i' and j' denote the positions of two of the contacts 31–36 of gauging heads 73 with reference to the master bell member and H denotes the distance of points i' and j' from the main geometric axis passing through O. Points i and j represent the position of the above mentioned contacts with reference to the bell member 1 to be checked. The distance of points i and j from the axis passing through O are $H+\Delta H_i$ and $H+\Delta H_j$, however, since $\Delta H_i$ and $\Delta H_j$ are in practice sufficiently smaller than H (H has a value of some tens of millimeters while $\Delta H_i$ and $\Delta H_j$ are not higher than some thousandths of millimeters), in the following calculations the quantities $\Delta H_i$ and $\Delta H_j$ are disregarded with respect to H without causing appreciable errors.

Centers $C'_i$, $C'_j$, $C_i$ and $C_j$ are defined, as mentioned before, by hemispheric sections 56 and by the associated contacts 19–24, therefore points i', j', i and j, i.e. the points of contact between contacts 31–36 of gauging heads 73 and ledges 74 are arranged on straight segments having an end in point O and passing through $C'_i$, $C'_j$ and $C_i$, $C_j$, respectively or on straight segments rotated, with respect to the preceding segments, of the same angle, due to the arrangement of ledges 74 with respect to arms 55. The calculation of the angles between the straight lines joining point O' and points i and j, respectively, is therefore equivalent to the calculation of angles $(\alpha_{i,j}+\beta_{i,j})$.

By simple trigonometric calculations it can be obtained:

$$(\alpha_{i,j} + \beta_{i,j}) = \alpha_{i,j} + \frac{G_{i,j}}{H} \sin \frac{\alpha_{i,j}}{2} + \frac{1}{H}(M_i + M_j) \quad (14)$$

$M_i$ and $M_j$ denote the signals of the gauging heads 73 which measure the displacements of hemispheric section 56 along directions trasversal with respect to races 5–10.

Notations $G_{i,j}$ indicate the components of eccentricity e along the directions of the lines bisecting angles $\alpha_{i,j}$.

From equation (14) it is evident that, since quantities $\alpha_{i,j}$ are known, circuit 103 can calculate angles $(\alpha_{i,j}+\beta_{i,j})$ by simple processing including means and multiplications by constant factors of signals $T_i$ and of the signals provided by gauging heads 73.

The apparatus described before, which serves for checking the bell member of a spheric constant velocity joint, may be easily rendered fit for checking the corresponding member of an axial constant velocity joint; for this purpose it suffices, in substance, to modify the shape of nose-piece 11.

By simple changes relating to the shape of nose-piece 11 and the arrangement of contacts 19–42, it is possible to check the inner race member of a spheric or axial constant velocity joint.

Several variants may be introduced in the described apparatus, for example it is possible to substitute prismatic centering elements for the hemispheric section 56, for the purpose of displacing contacts 19–24 against the bottom line of the races.

It is also evident that the described apparatus can be provided with automatic loading, positioning, unloading and sorting devices for rendering more or less automatic the handling of the members to be checked.

What is claimed is:

1. Method for checking a member of a constant velocity joint, the member defining a geometrical axis and including ball races angularly spaced with respect to the geometrical axis, comprising the step of obtaining measurement signals representative of dimensions of the ball races and the step of processing said signals for determining the positions of the centers of the ball races in an equatorial plane and for determining the center of a circumference approximating said centers, this center constituting a reference point for the member checking.

2. The method according to claim 1, wherein said processing step further comprises obtaining second signals representative of the distances of the centers of the ball races from said reference point and obtaining a third signal representative of the mislocation of the ball races as the difference between the maximum and the minimum values of said second signals.

3. The method according to claim 2, wherein the member defines a seat surface for the cage of the joint, further comprising the step of obtaining further measurement signals relative to points of the seat surface these further signals being representative of dimensions of the seat surface, and wherein the processing step comprises processing the further measurement signals for determining the center of a second circumference approximating said points of the seat surface and determining the relative mislocation of the seat surface and of the ball races depending on the positions of the centers of said circumferences.

4. The method according to claim 3, wherein the processing step comprises utilizing the statistical method of the least squares for determining the centers of said circumferences.

5. The method according to any of claims 1 to 4, comprising the additional measuring step of obtaining additional measurement signals representative of the angles defined by pairs of straight lines joining the centers of the ball races with a pre-set point and the additional processing step of processing the additional measurement signals for determining the angles defined by the pairs of straight lines joining the centers of the ball races with said reference points.

6. Method for checking a member of a constant velocity joint, the member defining a geometrical axis and including ball races having part-circular cross-sections, comprising:

defining, in an equatorial plane of the races, chords of the races having a pre-set value, these chords subtending relevant arcs of the races;

obtaining measurement signals representative of the positions of the centers of the races, substantially through measurement of the cambers of the arcs;

processing said measurement signals by statistical treatment for determining the center of a circumference approximating the centers of the races;

taking said center as a reference point; and determining the mislocation of the races through obtainment of signals representative of the distances of said centers of the races from the reference point.

7. Method for checking a member of a constant velocity joint, the member defining: a geometrical axis; ball races having cross-sections defining circular arcs; and a seat surface for housing the cage member of the joint, the seat surface defining substantially a spheric zone crossed by the ball races, comprising:

defining in an equatorial plane of the ball races chords of the races, the chords having a pre-set length;

obtaining first measurement signals representative of the heights of the arcs subtended by said chords in the equatorial plane of the ball races;

obtaining second measurement signals representative of the positions of said chords with respect to the geometrical axis;

obtaining third measurement signals representative of the radial distances of points of said seat surface from the geometrical axis, said points lying in the equatorial plane of the spheric zone;

processing said first and second measurement signals for obtaining fourth signals representative of the positions of the centers of the ball races in said equatorial plane of the races;

processing said fourth signals by statistical treatment for obtaining fifth signals representative of the position of the center of a circumference approximating the centers of the ball races;

taking said center as a reference point;

processing said fourth and fifth signals for obtaining sixth signals representative of the mislocation of the ball races depending on the distances of the centers of the ball races from the reference point;

processing said third measurement signals by statistical treatment for obtaining seventh signals representative of the position of the center of a circumference approximating said points of the seat surface; and processing said fifth and seventh signals for obtaining eighth signals representative of the mislocation of the seat surface with respect to the ball races.

8. Apparatus for checking a member of a constant velocity joint, the member defining a geometrical axis and ball races angularly spaced with respect to the geometrical axis, comprising:

a first support means for supporting the member;

a gauging means including a plurality of gauging heads for providing measurement signals representative of dimensions of the ball races in an equatorial plane of the ball races, said measurement signals depending on the positions of the centers of the races in said equatorial plane;

second support means coupled to the first support means for supporting the gauging means; and processing means connected to the gauging heads for processing the measurement signals for defining said centers of the ball races and for determining the center of a circumference approximating the centers of the ball races, whereby this center provides a reference point for the member checking, said processing means being adapted to provide second signals representative of the distances of the centers of the ball races from said reference point and to provide a third signal representative of the mislocation of the ball races as the difference between the maximum and minimum values of said second signals.

9. Apparatus for checking a member of a constant velocity joint, the member defining a geometrical axis, ball races angularly spaced with respect to the geometrical axis and a seat surface having substantially the shape of a spheric zone, for housing the cage of the joint, comprising:

a first support means for supporting the member;

a gauging means including a plurality of gauging heads for providing measurement signals representative of dimensions of the ball races in an equatorial plane of the ball races, said measurement signals depending on the position of the centers of the races in said equatorial plane and further gauging heads adapted to provide further measurement signals depending on the positions, with respect to said geometrical axis, of points of the seat surface laying in an equatorial plane of the seat surface;

a second support means coupled to the first support means for supporting the gauging means; and a processing means connected to the gauging heads for processing the measurement signals for defining said centers of the ball races and for determining the center of a circumference approximating the centers of the ball races, whereby this center provides a reference point for the member checking, and for processing the further measurement signals for determining the center of a second circumference approximating said points of the seat surface and for determining the relative mislocation of the seat surface and of the ball races depending on the positions of the centers of said circumferences.

10. Apparatus for checking a member of a constant velocity joint, the member defining a geometrical axis and ball races angularly spaced with respect to the geometrical axis, comprising:

a first support means for supporting the member;

a gauging means including a plurality of gauging heads for providing measurement signals representative of dimensions of the ball races in an equatorial plane of the ball races, said measurement signals depending on the positions of the centers of the races in said equatorial plane and additional gauging heads adapted to provide additional measurement signals representative of the angular relationships among the straight lines joining said centers of the ball races with the intersection point of the geometrical axis with said equatorial plane;

a second support means coupled to the first support means for supporting the gauging means; and a processing means connected to the gauging heads for processing the measurement signals for defining said centers of the ball races and for determining the center of a circumference approximating the centers of the ball races, whereby this center provides a reference point for the member checking and processing means connected to the additional gauging heads for determining the angular relationships among the straight lines joining the centers of the ball races with the center of the circumference approximating the centers of the ball races.

11. Apparatus for checking a member of a constant velocity joint, the member defining: a geometrical axis; ball races having cross-sections defining circular arcs; and a seat surface for housing the cage member of the joint, the seat surface defining substantially a spheric zone crossed by the ball races, wherein the apparatus comprises:

first support means for supporting and positioning the member with respect to said geometrical axis;

second support means coupled to the first support means;

gauging means supported by the second support means and including: reference elements; first fulcrum means coupled to the reference elements and to the second support means for permitting displacements of the reference elements substantially along relevant directions perpendicular to the ball races; second fulcrum means arranged between the first fulcrum means and the reference elements for permitting displacements of the reference elements substantially along relevant directions transversal with respect to the ball races, the reference elements being adapted to cooperate with symmetrical points of the sides of the ball races; first arms including first contacts for touching the bottom points of relevant ball races lying in an equatorial plane of the ball races; third fulcrum means for coupling the first arms to the reference elements, the third fulcrum means permitting displacements of the first contacts substantially along directions perpendicular to the relevant ball races; second arms coupled between the first fulcrum means and the second fulcrum means; third arms including second contacts adapted to cooperate with points of the seat surface lying in the equatorial plane of the seat surface; fourth fulcrum means for coupling the third arms with the second support means and for permitting displacements of the second contacts substantially along directions perpendicular to the seat surface; first gauging heads coupled to the reference elements and cooperating with the first arms for providing first measurement signals representative of the positions of said first contacts with respect to the reference elements; second gauging heads coupled to the second support means and cooperating with the second arms for providing second measurement signals representative of the positions of the reference elements substantially along the directions perpendicular to the ball races; third gauging heads coupled to the second arms and cooperating with the reference elements for providing third measurement signals representative of the positions of the reference elements substantially along said transversal directions; fourth gauging heads coupled to the second support means for cooperating with the third arms and providing fourth measurement signals representative of the positions of the second contacts; and processing means connected to the first, second, third and fourth gauging heads, the processing means being adapted to process the first and second measurement signals for providing fifth signals representative of the positions of the centers of the ball races, in the equatorial plane of the ball races, with respect to the geometrical axis, and to process the fifth signals, through statistical treatment, for obtaining sixth signals representative of the distances of the centers of the ball races from the center of a first circumference approximating the centers of the ball races; the processing means moreover processing the fourth measurement signals, through statistical treatment, for providing seventh signals representative of the position of the center of a second circumference approximating said points of the seat surface, the seventh and fifth signals being processed by the processing means for obtaining eighth signals representative of the eccentricity of the centers of said circumferences; the processing means also processing the fifth and the third signals for obtaining ninth signals representative of the angles defined by the pairs of straight lines joining the centers of the ball races with the center of said first circumference.

* * * * *

UNITED STATES PATENT AND TRADEMARK OFFICE
CERTIFICATE OF CORRECTION

PATENT NO. : 4,355,467
DATED : October 26, 1982
INVENTOR(S) : Gastone ALBERTAZZI It is certified that error appears in the above—identified patent and that said Letters Patent is hereby corrected as shown below:

Column 6, line 60, correct the spelling of "cage".

Column 7, line 19, correct the spelling of "notation".

Column 8, line 3, delete "means" and insert -- sums --.

Signed and Sealed this

Twenty-second Day of March 1983

[SEAL]

Attest:

GERALD J. MOSSINGHOFF

Attesting Officer

Commissioner of Patents and Trademarks